(12) United States Patent
Tanaka (10) Patent No.: US 12,036,532 B2
(45) Date of Patent: Jul. 16, 2024

(54) EXHAUST GAS PURIFICATION CATALYST AND EXHAUST GAS PURIFICATION SYSTEM USING THE EXHAUST GAS PURIFICATION CATALYST

(71) Applicant: MITSUI MINING & SMELTING CO., LTD., Tokyo (JP)

(72) Inventor: Hiroki Tanaka, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 325 days.

(21) Appl. No.: 17/614,913

(22) PCT Filed: May 12, 2020

(86) PCT No.: PCT/JP2020/019017
§ 371 (c)(1),
(2) Date: Nov. 29, 2021

(87) PCT Pub. No.: WO2020/241248
PCT Pub. Date: Dec. 3, 2020

(65) Prior Publication Data
US 2022/0234030 A1 Jul. 28, 2022

(30) Foreign Application Priority Data

May 31, 2019 (JP) ................................ 2019-102987

(51) Int. Cl.
*B01J 23/44* (2006.01)
*B01J 23/46* (2006.01)
(Continued)

(52) U.S. Cl.
CPC ............. *B01J 23/44* (2013.01); *B01J 23/464* (2013.01); *B01J 35/19* (2024.01); *B01J 35/633* (2024.01);
(Continued)

(58) Field of Classification Search
CPC ...... B01J 23/44; B01J 23/464; B01J 35/0006; B01J 35/1038; B01J 35/1042; B01J 35/1047; F01N 3/101
(Continued)

(56) References Cited

U.S. PATENT DOCUMENTS 6,764,665 B2 * 7/2004 Deeba .................. B01D 53/945
423/239.1
7,517,510 B2 * 4/2009 Chen .................... B01J 37/0244
422/177
(Continued)

FOREIGN PATENT DOCUMENTS

EP 3488927 A1 5/2019
JP 2003-326170 A 11/2003
(Continued)

OTHER PUBLICATIONS

PCT Notification of Transmittal of Translation of the International Preliminary Report on Patentability and PCT Written Opinion of The International Searching Authority dated Jun. 20, 2020 filed in PCT/JP2020/019017.
(Continued)

*Primary Examiner* — Cam N. Nguyen
(74) *Attorney, Agent, or Firm* — RANKIN, HILL & CLARK LLP (57) ABSTRACT

An exhaust gas purification catalyst comprises a substrate and a catalyst layer on the substrate, and has a first section upstream along a flow direction of the exhaust gas and a second section downstream from the first section. The catalyst layer in the first section comprises a first catalyst layer comprising palladium and a second catalyst layer comprising rhodium and covering the first catalyst layer. A pore volume proportion, which is a proportion of a total volume of the pores having a pore diameter of 0.06-30.0 μm as measured by mercury press-in method and existing in the
(Continued)

substrate and the catalyst layer in the first section to a volume of a entire first section, is 12-18%. A wash coat amount, which is a mass per unit volume of the catalyst layer in the first section to the volume of the substrate existing in the first section, is 100-190 g/L.

9 Claims, 1 Drawing Sheet

(51) Int. Cl.
    *B01J 35/00*         (2024.01)
    *B01J 35/10*         (2006.01)
    *B01J 35/63*         (2024.01)
    *B01J 37/03*         (2006.01)
    *F01N 3/10*         (2006.01)

(52) U.S. Cl.
    CPC ........... *B01J 35/635* (2024.01); *B01J 35/638* (2024.01); *B01J 37/038* (2013.01); *F01N 3/101* (2013.01); *F01N 2570/10* (2013.01); *F01N 2570/12* (2013.01); *F01N 2570/14* (2013.01)

(58) Field of Classification Search
    USPC .......... 502/333, 339, 527.12, 527.13, 527.19
    See application file for complete search history.

(56) References Cited

U.S. PATENT DOCUMENTS

| | | | | |
|---|---|---|---|---|
| 7,547,656 | B2* | 6/2009 | Miura | B01D 53/945 |
| | | | | 502/527.12 |
| 7,550,124 | B2* | 6/2009 | Chen | F01N 13/0097 |
| | | | | 422/177 |
| 7,729,283 | B2* | 6/2010 | Ferguson | H04L 65/1101 |
| | | | | 713/168 |
| 7,758,834 | B2* | 7/2010 | Chen | F01N 13/0097 |
| | | | | 60/299 |
| 7,795,172 | B2* | 9/2010 | Foong | B01J 23/63 |
| | | | | 502/527.19 |
| 8,153,549 | B2* | 4/2012 | Cho | B01J 37/0244 |
| | | | | 502/527.12 |
| 8,323,599 | B2* | 12/2012 | Nunan | B01J 35/0006 |
| | | | | 60/299 |
| 8,394,348 | B1* | 3/2013 | Nunan | B01J 35/04 |
| | | | | 60/299 |
| 8,551,908 | B2* | 10/2013 | Satou | B01J 23/63 |
| | | | | 502/262 |
| 8,557,204 | B2* | 10/2013 | Nunan | B01J 35/0006 |
| | | | | 422/177 |
| 8,568,675 | B2* | 10/2013 | Deeba | B01J 37/0248 |
| | | | | 422/177 |
| 8,784,759 | B2* | 7/2014 | Hilgendorff | B01J 35/04 |
| | | | | 502/328 |
| 8,828,343 | B2* | 9/2014 | Liu | B01J 37/0228 |
| | | | | 502/262 |
| 8,906,330 | B2* | 12/2014 | Hilgendorff | B01J 23/40 |
| | | | | 502/262 |
| 8,950,174 | B2* | 2/2015 | Hilgendorff | B01J 35/023 |
| | | | | 60/299 |
| 8,968,690 | B2* | 3/2015 | Nunan | B01J 35/1019 |
| | | | | 422/177 |
| 9,511,360 | B2* | 12/2016 | Wille | B01J 37/04 |
| 9,517,462 | B2* | 12/2016 | Roesch | B01J 23/63 |
| 9,581,063 | B2* | 2/2017 | Klingmann | F01N 13/009 |
| 9,597,663 | B2* | 3/2017 | Inoda | B01J 23/464 |
| 9,656,209 | B2* | 5/2017 | Chang | B01J 37/0063 |
| 9,744,529 | B2* | 8/2017 | Xue | F01N 3/2828 |
| 9,981,258 | B2* | 5/2018 | Xue | F01N 3/0842 |
| 10,323,554 | B2* | 6/2019 | Suzuki | F01N 3/2825 |
| 10,337,372 | B2* | 7/2019 | Nobukawa | F01N 3/2066 |
| 10,512,898 | B2* | 12/2019 | Deeba | B01J 35/0006 |
| 10,539,056 | B2* | 1/2020 | Suzuki | B01J 35/023 |
| 10,556,223 | B2* | 2/2020 | Suzuki | B01J 37/031 |
| 10,576,420 | B2* | 3/2020 | Chinzei | B01J 37/009 |
| 10,669,910 | B2* | 6/2020 | Chen | F01N 3/0842 |
| 10,688,476 | B2* | 6/2020 | Onoe | B01J 23/44 |
| 10,731,532 | B2* | 8/2020 | Suzuki | F01N 3/101 |
| 11,110,435 | B2* | 9/2021 | Onoe | B01J 35/0006 |
| 11,141,697 | B2* | 10/2021 | Chen | B01J 35/1019 |
| 11,224,840 | B2* | 1/2022 | Suzuki | F01N 3/101 |
| 11,248,505 | B2* | 2/2022 | Sung | B01J 23/02 |
| 11,260,372 | B2* | 3/2022 | Xue | B01J 37/0242 |
| 11,433,377 | B2* | 9/2022 | Nagai | B01D 46/24492 |
| 11,458,460 | B2* | 10/2022 | Tanaka | F01N 3/10 |
| 11,517,881 | B2* | 12/2022 | Tanaka | F01N 3/10 |
| 2010/0215557 | A1* | 8/2010 | Liu | B01J 37/0248 |
| | | | | 502/333 |
| 2017/0189892 | A1* | 7/2017 | Yin | B01J 37/024 |
| 2017/0297005 | A1 | 10/2017 | Onoe et al. | |
| 2019/0091662 | A1 | 3/2019 | Camm et al. | |
| 2019/0240643 | A1* | 8/2019 | Karpov | B01J 23/44 |
| 2020/0030745 | A1* | 1/2020 | Utschig | B01J 37/0018 |
| 2020/0316579 | A1 | 10/2020 | Takesue et al. | |
| 2022/0025796 | A1* | 1/2022 | Vjunov | B01J 37/0244 |
| 2022/0055021 | A1* | 2/2022 | Liu | B01J 21/04 |
| 2022/0161236 | A1* | 5/2022 | Vjunov | B01J 23/42 |
| 2022/0193638 | A1 | 6/2022 | Tanaka et al. | |
| 2022/0193639 | A1* | 6/2022 | Vjunov | B01J 37/0244 |

FOREIGN PATENT DOCUMENTS

| | | |
|---|---|---|
| JP | 2010-5592 A | 1/2010 |
| JP | 2014-509242 A | 4/2014 |
| WO | 2012/069405 A1 | 5/2012 |
| WO | 2016/039302 A1 | 3/2016 |
| WO | 2017/204008 A1 | 11/2017 |
| WO | 2019/187199 A1 | 10/2019 |

OTHER PUBLICATIONS

International Search Report (ISR) dated Jun. 30, 2020 filed in PCT/JP2020/019017.

* cited by examiner

EXHAUST GAS PURIFICATION CATALYST AND EXHAUST GAS PURIFICATION SYSTEM USING THE EXHAUST GAS PURIFICATION CATALYST

CROSS-REFERENCE TO RELATED APPLICATIONS

This application is a National Phase Application of International Application No. PCT/JP2020/019017, filed May 12, 2020, which claims the priority of Japan Patent Application No. 2019-102987, filed May 31, 2019. The present application claims priority from both applications and each of these applications is herein incorporated in their entirety by reference.

FIELD OF THE INVENTION

The present invention relates to an exhaust gas purification catalyst provided in an exhaust system of an internal combustion engine, and an exhaust gas purification system using the exhaust gas purification catalyst.

BACKGROUND ART

Harmful components such as HC (hydrocarbon), CO (carbon monoxide) and NOx (nitrogen oxide) are contained in emission gas (also referred to as exhaust gas) emitted from internal combustion engines of automobiles, motorcycles, and the like. Conventionally, three-way catalysts have been used to purify and detoxify these deleterious components. As the three-way catalyst, those using noble metals such as Pt (platinum), Pd (palladium), and Rh (rhodium) are known. Pt and Pd mainly act for oxidative purification of HC and CO, while Rh mainly acts for reduction purification of NOx. In recent years, attempts have been made to improve the exhaust gas purification performance of the above-mentioned noble metal catalysts due to tightening of exhaust gas regulations and enhancement of environmental consciousness.

For example, Patent Document 1 proposes an exhaust gas purification catalyst which can exhibit high exhaust gas purification performance even when an internal combustion engine is warmed up by sectioning the upstream side and the downstream side in the exhaust gas flow direction by a catalyst layer having a different catalyst composition, arranging Pd having excellent low-temperature catalytic activity in the upstream side section where temperature rises quickly, and reducing the heat capacity by reducing the amount of the catalyst supported (i.e., the amount of Pd catalyst washcoat on the catalyst layer).

Further, Patent Document 2 proposes a exhaust gas purifying catalyst which can exhibit high exhaust gas purification performance even during warm-up by adding thickness and lightness to Pd concentration in the cross-sectional thickness direction of the catalyst layer on the upstream side in the exhaust gas flow direction, and making the Pd concentration higher on the surface side of the catalyst layer where the exhaust gas first comes into contact.

PRIOR ART DOCUMENT

Patent Document

Patent Document 1: JP 2010-5592 A
Patent Document 2: WO2016/039302

SUMMARY OF THE INVENTION

Problems to be Solved by the Invention

Incidentally, it is known that catalytic activity of a Pd catalyst used for oxidizing and purifying HC and CO is lost due to phosphorus derived from engine oil or the like (phosphorus poisoning). Therefore, even in the exhaust gas purification catalysts proposed in Patent Documents 1 and 2, it is considered that the Pd catalyst layer disposed on the upstream side of the catalyst layer is also poisoned by phosphorus. It is considered that an exhaust gas purification catalyst can have excellent exhaust gas purification performance during warm-up and high-speed operation of an engine without lowering the Pd catalytic activity by forming a catalyst layer on the upstream side into multiple layers and providing another catalyst layer containing Rh or the like on the surface of the Pd catalyst layer in order to suppress the phosphorus poisoning of the Pd catalyst layer.

However, if the Rh catalyst layer is provided on the surface of the Pd catalyst layer on the upstream side in the exhaust gas purification catalyst as proposed in Patent Document 1, not only the characteristics of Pd cannot be utilized because the exhaust gas comes into contact with the Pd catalyst layer after passing through the Rh catalyst layer, but also the amount of wash coat increases by making the catalyst layer on the upstream side multi-layered, and thus heat capacity increases and temperature rise performance is impaired.

It is considered the significance of increasing the Pd concentration on the surface of the Pd catalyst layer is impaired also in the exhaust gas purification catalyst of Patent Document 2, because if the surface of the Pd catalyst layer having a high Pd concentration is covered with the Rh catalyst layer, the characteristics of the Pd catalyst that it is excellent in low-temperature activity cannot be fully utilized, in addition to the fact that the exhaust gas is inhibited from being brought into contact by the Rh catalyst layer provided on the surface of the Pd catalyst layer in the same manner as described above.

Accordingly, it is an object of the present invention to provide an exhaust gas purification catalyst capable of exhibiting even higher exhaust gas purification performance without impairing Pd catalytic activity, and an exhaust gas purification system using the exhaust gas purification catalyst.

Means for Solving the Problem

The present inventors have found that, when an Rh catalyst layer is provided on the surface of a Pd catalyst layer in the upstream-side catalyst layer, an exhaust gas purification catalyst having excellent exhaust gas purification performance during warm-up and high-speed operation of an engine can be provided while suppressing the decrease in catalytic activity due to phosphorus poisoning of the Pd catalyst layer if the amount of wash coat when forming the upstream-side catalyst layer is set to a specific amount and a certain number of pores are provided in the formed catalyst layer. The present invention is based on such finding.

That is, the gist of the present invention is as follows.

[1] An exhaust gas purification catalyst comprising a substrate and a catalyst layer provided on the substrate,
wherein the catalyst layer has a first section located upstream along a flow direction of the exhaust gas and a second section located on the downstream side than the first section; wherein the catalyst layer in the first section comprises a first catalyst layer comprising palladium and a second catalyst layer comprising rhodium and covering the first catalyst layer;

a pore volume proportion, which is a proportion of a total volume of the pores existing in the substrate and the catalyst layer in the first section to the volume of the entire first section is 12% or more and less than 18%, wherein the pore diametre as measured by mercury press-in method is 0.06 µm to 30.0 µm;

and a wash coat amount, which is the mass per unit volume of the catalyst layer in the first section to the volume of the substrate existing in the first section, is 100 g/L to 190 g/L.

[2] The exhaust gas purification catalyst according to [1], wherein when the first catalyst layer is divided into two equal portions along the thickness direction, and the mass of palladium existing on a surface side of the first catalyst layer is defined a1 and the mass of palladium existing on an opposite side to the surface side of the first catalyst layer is defined as a2, a value of a1/a2 is 1.2 or more.

[3] The exhaust gas purification catalyst according to [1] or [2], wherein the pore volume proportion, which is a proportion of a total volume of the pores present in the substrate and the catalyst layer in the second section to a volume of the entire second section is 18% to 25%, wherein a pore diametre measured by the mercury press-in method is 0.06 µm to 30.0 µm.

[4] The exhaust gas purification catalyst according to any one of [1] to [3], wherein the catalyst layer in the second section comprises a third catalyst layer comprising palladium and a fourth catalyst layer comprising rhodium and covering the third catalyst layer.

[5] The exhaust gas purification catalyst according to any one of [1] to [4], wherein the pore volume proportion of the substrate and the catalyst layer in the first section is not more than 90% of the pore volume proportion of the substrate and the catalyst layer in the second section.

[6] The exhaust gas purification catalyst according to any one of [1] to [5], wherein the wash coat amount which is the mass per unit volume of the catalyst layer in the second section relative to the volume of the substrate existing in the second section is 180 g/L to 300 g/L.

[7] The exhaust gas purification catalyst according to any one of [1] to [6], wherein the second catalyst layer has a through-hole having a width of 10 µm or more through which gas passes from a surface thereof to the first catalyst layer.

[8] The exhaust gas purification catalyst according to any one of [1] to [7], wherein a length of the flow direction of the exhaust gas of the first section is 20% to 70% with respect to a length of the flow direction of the exhaust gas of the substrate.

[9] An exhaust gas purification system in which, in an exhaust path connected to an internal combustion engine, exhaust gas from the internal combustion engine is introduced into the exhaust gas purification catalyst according to any one of [1] to [8] without passing through any other exhaust gas purification catalyst.

Effect of the Invention

In an exhaust gas purification catalyst in which a catalyst layer which is divided into a first section of an upstream side and a second section of a downstream side, it is possible to provide an exhaust gas purification catalyst having excellent exhaust gas purification performance during warm-up and high-speed operation of an engine while suppressing catalytic activity of a Pd catalyst layer due to phosphorus poisoning from decreasing according to the present invention, when a catalyst layer in the first section comprises a first catalyst layer comprising palladium and a second catalyst layer comprising rhodium and covering the first catalyst layer, and the first section is made in to a catalyst layer having a wash coat amount of 100 g/L or more and 190 g/L or less and a pore volume proportion of 12% or more and less than 18%.

DETAILED DESCRIPTION OF THE INVENTION

Figure 1:
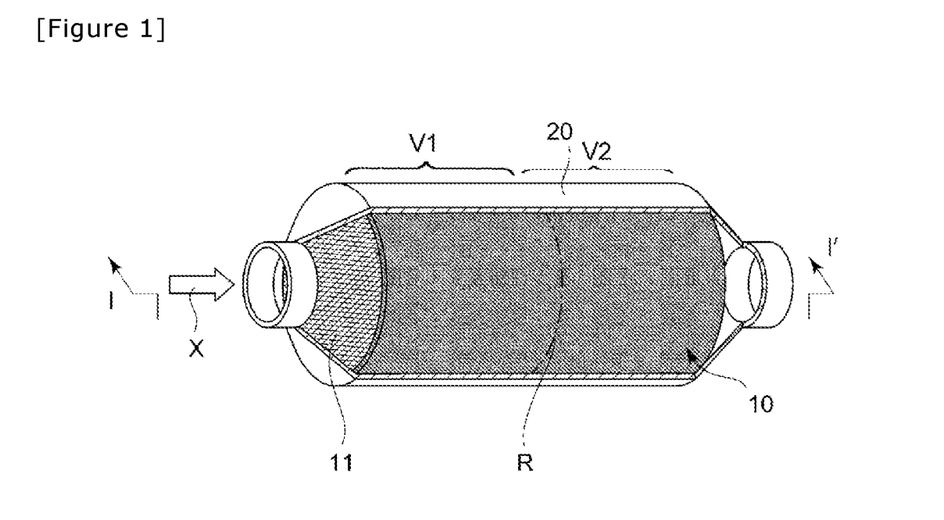
FIG. 1 is a schematic diagram of an exhaust gas purification catalyst according to one embodiment of the present invention, which is stored in a casing through which exhaust gas flows.
Figure 2:
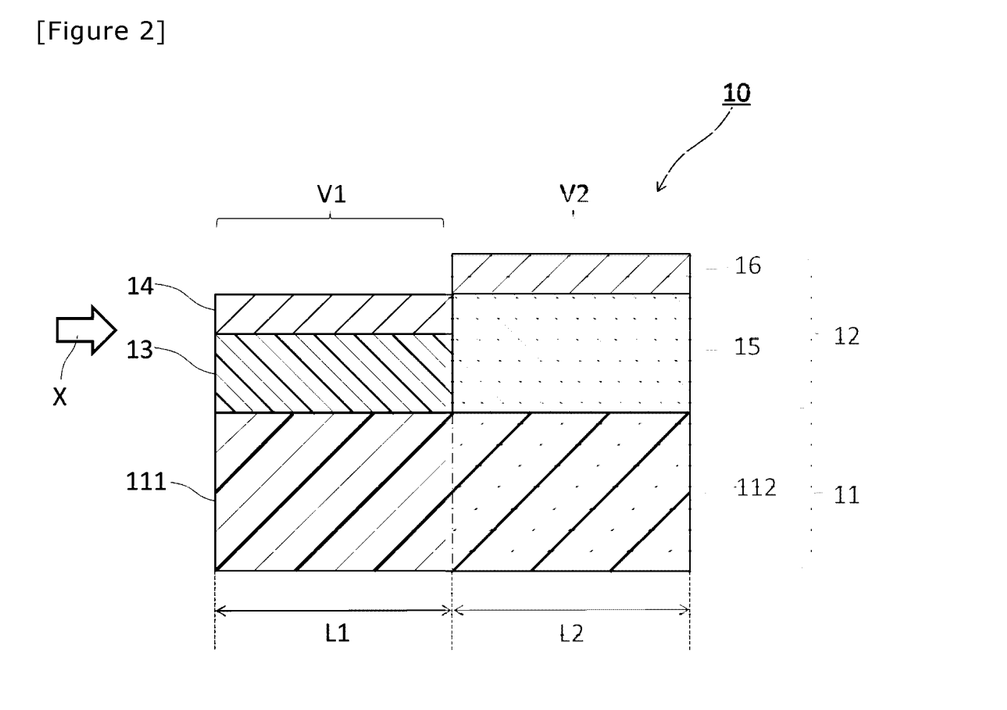
FIG. 2 is a partially enlarged schematic diagram of a cross-section taken along line I-I' related to the exhaust gas purification catalyst of FIG. 1.

An exhaust gas purification catalyst according to one embodiment of the present invention will be described with reference to the drawings. FIG. 1 is a schematic view showing a state in which the exhaust gas purification catalyst is stored in a casing through which exhaust gas flows, and FIG. 2 is a partially enlarged schematic view of a cross section taken along line I-I' of the exhaust gas purification catalyst shown in FIG. 1. As shown in FIG. 1, the exhaust gas purification catalyst 10 is disposed in the casing 20 and is installed in a flow path of the exhaust gas.

Exhaust gas purification catalyst 10 comprises substrate 11 and catalyst layer 12 formed on the substrate 11. The exhaust gas purification catalyst 10 has first section V1 located on the upstream side and second section V2 located on the downstream side from the first section, along the flow direction X of exhaust gas. The catalyst layer in the first section V1 located upstream alone the flow direction of exhaust gas has a multilayer structure in which first catalyst layer 13 and second catalyst layer 14 are laminated in this order from the side of the substrate 111, and the first catalyst layer 13 is covered by the second catalyst layer 14. In the embodiment shown in FIG. 2, the catalyst layer in the first section V1 has a laminated structure of two layers, but another catalyst layer (not illustrated) may be further provided on the surface of the second catalyst layer 14. In addition, another catalyst layer (not illustrated) may be provided between the first catalyst layer 13 and the second catalyst layer 14. Further, another catalyst layer (not illustrated) may be provided between the substrate 111 and the first catalyst layer 13.

The catalyst layer in the second section V2 has a multilayer structure in which third catalyst layer 15 and fourth catalyst layer 16 are laminated in this order from the side of substrate 112, and the third catalyst layer 15 is covered with the fourth catalyst layer 16. In the embodiment shown in FIG. 2, the catalyst layer in the second section V2 has a laminated structure of two layers, but the catalyst layer in the second section V2 may have a single-layer structure, in which case the fourth catalyst layer 16 may be omitted. Further, another catalyst layer (not illustrated) may be provided on the surface of the third catalyst layer 15 or the fourth catalyst layer 16, and another catalyst layer (not illustrated) may be provided between the third catalyst layer 15 and the fourth catalyst layer 16. Further, another catalyst layer (not illustrated) may be provided between the substrate 112 and the third catalyst layer 15.

It is preferable that the first section V1 and the second section V2 are in contact with each other without a gap in the exhaust gas flow direction X, in view that the temperature of the second section V2 can be raised efficiently by heat generated by exothermic reactions such as HC oxidation and CO oxidation promoted by the catalytic active component in the first section V1.

<Substrate>

As the substrate 11, it is possible to use a substrate used for a known exhaust gas purification catalyst, an example thereof including a substrate having a partition wall made of a porous material and an exhaust gas flow path (space between the partition walls) sectioned by the partition wall. As the shape of the substrate 11, it is possible to suitably use a known substrate such as a honeycomb, DPF or GPF. Examples of the material of the partition wall of the substrate 11 include ceramics such as alumina ($Al_2O_3$), mullite ($3Al_2O_3$-$2SiO_2$), cordierite ($2MgO$-$2Al_2O_3$-$5SiO_2$), aluminum titanate ($Al_2TiO_5$) and silicon carbide (SiC), and metal materials such as stainless steel.

An exhaust gas purification catalyst 10 having a substrate 11 and a catalyst layer 12 formed on the substrate 11 (i.e., a catalyst layer formed on the surface of a partition wall of the substrate) is also referred to as a catalytic converter. In the example shown in FIG. 1, the substrate 11 has a shape long in one direction, and is arranged so that the exhaust gas flow direction X and the longitudinal direction coincide with each other. In FIG. 1, R denotes a boundary portion dividing the first section V1 and the second section V2. In FIG. 2, the substrate existing in the first section V1 is defined as the substrate 111 and the substrate existing in the second section V2 is defined as the substrate 112 in the substrate 11, but the substrate 11 is divided into the substrate 111 and the substrate 112 for convenience in describing the invention, and the substrate 111 and the substrate 112 are substantially made of the same material.

<Catalyst Layer of First Section>

The first catalyst layer 13 constituting the catalyst layer in the first section V1 comprises palladium (Pd) as a catalytically active component, but may also contain other catalytically active components such as platinum (Pt) and rhodium (Rh). In particular, it is preferable to contain Pd and Pt as the catalytically active components from the viewpoint of high purification performance of carbon monoxide (CO) and hydrocarbon (HG) and obtaining a warming function.

It is preferable for the first catalyst layer 13 to further contain a carrier component carrying the above-described catalytic active component in view of efficiently demonstrating the exhaust gas purification performance by the catalytic active component. The carrier component as used herein is an oxygen storage component (hereinafter also referred to as an OSC material) or an inorganic oxide other than the oxygen storage component. When an exhaust gas purification catalyst is used for a gasoline engine of theoretical air-fuel ratio control, the first catalyst layer 13 preferably contains an oxygen storage component as a carrier component in order to stably exhibit a high purification rate with respect to variation in the air-fuel ratio. When an oxygen storage component is contained, it is preferable that the oxygen storage component and the inorganic oxide other than the oxygen storage component exist in a mixed state.

Supporting the catalytically active component means a state in which it is physically or chemically adsorbed or supported on the outer surface or the inner surface of the pore. Specifically, the fact that the carrier component is supporting the catalytically active component can be determined as the support component is "supporting" the catalytically active component by confirming that the support component and the catalytically active component are present in the same region in an element mapping which was obtained by EDS (energy dispersive spectrometer) by analyzing the cross section of the exhaust gas purification catalyst 10 for example.

Any metal oxide can be used as the oxygen storage component without particular limitation, in which the valence of the constituent element changes under operating conditions of the exhaust gas purification catalyst and which has the ability to store oxygen, and for example, $CeO_2$ or $CeO_2$—$ZrO_2$ (ceria-zirconia composite oxide containing Ce and Zr, or a solid solution of $CeO_2$ and $ZrO_2$) are preferable because the OSC of the exhaust gas purification catalyst is high. The solid solution of $CeO_2$ and $ZrO_2$ can be confirmed by using an X-ray diffraction apparatus (XRD) and determining whether or not a single phase derived from $CeO_2$—$ZrO_2$ is formed. A porous material is preferred as the oxygen storage component because it is easy to support the catalytic active component. Examples of the porous material include those having a BET specific surface area of 30 $m^2$/g to 210 $m^2$/g.

The oxygen storage component may contain rare earth elements other than cerium (Ce) or alkaline earth metal elements such as barium (Ba), strontium (Sr), or calcium (Ca). Examples of the rare earth elements other than cerium include scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). These rare earth elements are added to the oxygen storage component as oxides, for example. The oxides of the rare earth elements are sesquioxides (Re2O3, Re is a rare earth element) except for praseodymium (Pr) and terbium (Tb). These may be a complex oxide consisted of two or more kinds. Praseodymium oxide is usually $Pr_6O_{11}$ and terbium oxide is usually $Tb_4O_7$. These oxides of rare earth elements other than cerium may or may not form a solid solution with $CeO_2$—$ZrO_2$. Whether or not the oxides of the rare earth elements other than cerium form a solid solution with $CeO_2$—$ZrO_2$ can be confirmed by X-ray diffraction (XRD) in the same manner as described above.

In addition to the above, examples of the oxygen storage component include oxides of elements such as manganese (Mn), iron (Fe), and copper (Cu), which are liable to cause a valence state change under the use conditions of a catalyst, and complex oxides containing these elements.

Examples of the inorganic oxides other than the oxygen storage component that is a carrier component for supporting the catalytic active component include metal oxides other than the oxygen storage component mentioned above, for example, rare earth oxides ($Re_2O_3$) such as $Al_2O_3$, $ZrO_2$, $SiO_2$, $TiO_2$ and $La_2O_3$, oxide materials based on zeolite (aluminosilicate), MgO, ZnO and $SnO_2$, and oxide materials obtained by compounding these materials with each other. Examples include phosphates and borates such as aluminum (Al), zirconium (Zr), silicon (Si), titanium (Ti), rare earth elements, magnesium (Mg), and zinc (Zn), and poorly soluble sulfates with alkaline earth metals such as Ba and Sr. The inorganic oxide other than the oxygen storage component is preferably a porous material. Examples of the porous material include those having a BET specific surface area of 30 $m^2$/g to 600 $m^2$/g.

The above-mentioned inorganic oxides include those which modify or support the oxygen storage component. For example, the inner surface or the outer surface of pores such as alumina may be modified by $CeO_2$. Modification as used herein is a concept encompassing a supported state, for example, a state in which fine oxygen-storing components are dispersed on the inner surface and the outer surface of pores such as alumina. Alumina may be modified by lanthanum oxide, $ZrO_2$, or the like.

Further, the first catalyst layer 13 may contain an alkaline earth metal compound from the viewpoint of suppressing the catalytic activity from decreasing due to phosphorus poisoning and heat resistance. Preferred examples of the alkaline earth metal include Sr and Ba. As the alkaline earth metal compound, an oxide may be used in addition to nitrate and carbonate.

In order to form the first catalyst layer 13 on the substrate 11 (i.e., a partition wall of the substrate), a slurry is prepared by kneading the above-mentioned salts of the catalytic active component (e.g., palladium nitrate, rhodium nitrate and platinum nitrate), a carrier component and a liquid medium such as water by a ball mill or the like, and the slurry is applied to the surface of the substrate by a wash coating method, followed by drying and burning. By adjusting the amount of wash coat, the first catalyst layer 13 having a desired thickness can be formed. The amount of wash coat for the slurry will be described later.

From the viewpoint of the catalytic activity of an exhaust gas purification catalyst, the temperature at which the substrate coated with the slurry is burned is preferably 400° C. to 800° C., and more preferably 450° C. to 600° C. The burning time is preferably 0.5 hours to 6 hours, and more preferably 1 hour to 4 hours. Further, it is preferable that the slurry applied to the substrate is dried before burning, and the temperature thereof is preferably 40° C. to 200° C., and more preferably 70° C. to 150° C. The drying time is preferably 5 minutes to 6 hours, and more preferably 10 minutes to 2 hours.

The second catalyst layer 14 covering the first catalyst layer 13 contains rhodium (Rh) as a catalytically active component. As described above, when the first catalyst layer 13 containing Pd as a catalytically active component is exposed, the exhaust gas first comes into contact with the first catalyst layer 13, therefore, when phosphorus is contained in the exhaust gas, the catalytic activity of Pd is reduced. In the present invention, the order to reduce phosphorus poisoning of Pd, the first catalyst layer (13) is covered with the second catalyst layer (14).

The second catalyst layer 14 may contain a catalytic active component other than Rh as the catalytic active component, for example, Pt or Pd.

It is preferable that the second catalyst layer 14 further contains a carrier component that supports a catalytically active component, in view of efficiently demonstrating the exhaust gas purification performance by the catalytically active component. As the carrier component referred herein, it is possible to use an oxygen storage component or an inorganic oxide similar to those used for the first catalyst layer 13.

In order to form the second catalyst layer 14 on the first catalyst layer 13, a slurry is prepared by kneading a liquid medium such as the above-mentioned salts of the catalytic active component (for example, palladium nitrate, rhodium nitrate and platinum nitrate), a carrier component and a liquid medium such as water by a ball mill or the like in the same manner as the method for forming the first catalyst layer 13, and the slurry is applied to the surface of the first catalyst layer 13 by a wash coating method, followed by drying and burning. The second catalyst layer 14 having a desired thickness can be formed by adjusting the amount of wash coat. The amount of wash coat for the slurry will be described later. The burning temperature and the drying temperature can be set to the same conditions as those for forming the first catalyst layer.

The mass per unit volume of the catalyst layer (the first catalyst layer 13 and the second catalyst layer 14) in the first section V1 relative to the volume of the substrate present in the first section V1 (hereinafter referred to as the "wash coat amount") is 100 g/L to 190 g/L. The wash coat amount as used herein means the amount of slurry that adheres per 1 L of substrate in the substrate 111 that is present in the first section V1 (mass of the solid). Note that, the mass of solid means the mass calculated by subtracting the mass of a component that is to disappear by drying or burning the slurry (e.g. solvent, pore-forming agent, etc.)

Increasing the amount of wash coat has the advantage that it is possible to increase the amount of the support material and the OSC material that enhance the dispersibility of the catalytically active component in the formed catalyst layer, while also increasing the amount of the catalyst. As a result, heat capacity of the catalyst layer increases and requires time to raise the temperature of the catalyst layer, so that exhaust gas purification performance during warm-up of the engine tends to decrease. In the present invention, the wash coat amount set to 190 g/L or less suppresses the heat capacity from becoming too large and high exhaust gas purification performance can be exhibited even during warm-up of the engine. On the other hand, when the wash coat amount of the catalyst layer in the first section exceeds 190 g/L, the heat capacity of the catalyst layer in the first section becomes large and the exhaust gas purification performance during warm-up of the internal combustion engine may become insufficient. On the other hand, when the wash coat amount of the catalyst layer in the first section is less than 100 g/L, the amount of the catalytic active component becomes insufficient which in turn may make the oxidation purification of HC and CO or the reduction purification of NOx insufficient. A preferred wash coat amount of the catalyst layer in the first section is 140 g/L to 170 g/L.

In the following will be described one example of a method for calculating the wash coat amount of the catalyst layers (the first catalyst layer 13 and the second catalyst layer 14) in the first section V1.

First, a sample extending in the exhaust gas flow direction of the substrate 11 (X direction in FIG. 2) and having the same length as the length L1 of the substrate 111 is cut out from the exhaust gas purification catalyst 10. The sample is, for example, a cylindrical shape having a diametre of 25.4 mm. Next, the cut sample is cut in a plain surface perpendicular to the exhaust gas flow direction of the substrate 11 to prepare a cut piece S1 of the exhaust gas purification catalyst 10 including the catalyst layers (first catalyst layer 13 and second catalyst layer 14) of the first section V1. The cut piece S1 is, for example, a cylindrical shape having a diametre of 25.4 mm and a length of 10 mm. Although the value of the diametre of the cut piece S1 can be changed as necessary, the exhaust gas purification catalyst 10 may be cut as it is in a plain surface perpendicular to the exhaust gas flow direction so as to have the same diametre as the exhaust gas purification catalyst 10 from the viewpoint of suppressing variation in the wash coat amount depending on the cutting position of the sample. Further, the length value of the cut piece S1 can be changed as necessary. The length of the catalyst layer in the first section V1 included in the cut piece S1 is equal to the length of the cut piece S1.

Subsequently, a cut piece of the substrate 11 having the same size as the cut piece S1 is prepared. As for a cut piece of the substrate 11, one is prepared which does not include any of the catalyst layer in the first section V1 and the catalyst layer in the second section V2.

The mass of the cut piece S1 and the mass of the cut piece of the substrate 11 are measured, and the mass of the catalyst layer in the first section V1 per unit volume of the cut piece S1 is calculated on the basis of the following formula.

Mass of catalyst layer in first section $V1$ per unit volume of cut piece $S1$=((Mass of cut piece $S1$)−(Mass of cut piece of substrate 11))/(Volume of cut piece($S1$))

The volume of the cut piece S1 is an apparent volume of the cut piece S1. For example, when the cut piece S1 has a cylindrical shape having a diametre of 25.4 mm and a length of 10 mm, the volume of the cut piece S1 is $\pi \times (12.7 \text{ mm})^2 \times 10$ mm. The volume of the other cut pieces (cut piece S2 to be described below) is also the same.

The mass of the catalyst layer in the first section V1 per unit volume of the cut piece S1 is calculated with respect to three cut pieces S1 produced from any point of the exhaust gas purification catalyst 10, and the average value thereof is used as the wash coat amount of the catalyst layers (the first catalyst layer 13 and the second catalyst layer 14) of the first section V1 with respect to the volume of the substrate 111 present in the first section V1.

When calculating the wash coat amount of the catalyst layer in the first section V1, the mass of the catalyst layer in the first section V1 per unit volume of the cut piece S1 may be calculated without using the cut piece of the substrate 11. One example of such a calculation method is as follows.

First, the mass and volume of the cut piece S1 produced in the same manner as described above are measured. The composition of the substrate 11 contained in the cut piece S1 is specified by element mapping or the like of the cross section of the cut piece S1. The element mapping can be performed by using a scanning electron microscope (SEM), an electron beam microanalyzer (EPMA) or the like. Further, the composition of the cut piece S1 is specified by analysis with an inductively coupled plasma emission spectrometer (ICP-AES) or the like. Next, based on the specified composition of the substrate 11 and the cut piece S1, the proportion of the mass of the catalyst layer of the mass of the cut piece S1 is calculated, and based on the following formula, the mass of the catalyst layer in the first section V1 per unit volume of the cut piece S1 is calculated.

Mass of catalyst layer of first section $V1$ per unit volume of cut piece $S1$=(Mass of cut piece $S1$)×(Proportion of mass of catalyst layer of first section $V1$ of mass of cut piece $S1$)/(Volume of cut piece $S1$)

Next, one example of a method for calculating each of the wash coat amounts of the first catalyst layer 13 and the second catalyst layer 14 constituting the catalyst layer in the first section V1 will be described. With respect to the wash coat amount of the first catalyst layer 13, the compositions of the substrate 11 and the first catalyst layer 13 contained in the cut piece S1 are specified by elemental mapping, or the like of the cross section of the cut piece S1. Further, the composition of the cut piece S1 is determined by analyzing by ICP-AES or the like. The proportion of the mass of the first catalyst layer 13 in the mass of the cut piece S1 is calculated based on the determined compositions of the substrate 11, the first catalyst layer 13, and the cut piece S1. The mass of the first catalyst layer 13 per unit volume of the cut piece S1 is calculated based on the following formula.

Mass of first catalyst layer 13 per unit volume of cut piece $S1$=(Mass of cut piece $S1$)×(Proportion of mass of first catalyst layer 13 in mass of cut piece $S1$)/(volume of cut piece $S1$)

Likewise, with respect to the wash coat amount of the second catalyst layer 14, the compositions of the substrate 11 and the second catalyst layer 14 contained in the cut piece S1 are specified by element mapping or the like of the cross section of the cut piece S1. Further, the composition of the cut piece S1 is analyzed by ICP-AES or the like. The proportion of the mass of the second catalyst layer 14 in the mass of the cut piece S1 is calculated based on the specified compositions of the substrate 11, the second catalyst layer 14, and the cut piece S1. The mass of the second catalyst layer 14 per unit volume of the cut piece S1 is calculated based on the following formula.

Mass of second catalyst layer 14 per unit volume of cut piece $S1$=(Mass of cut piece $S1$)×(Proportion of mass of second catalyst layer 14 in mass of cut piece $S1$)/(Volume of cut piece $S1$)

The wash coat amount of the first catalyst layer 13 in the catalyst layer in the first section V1 is preferably 50 g/L to 140 g/L and more preferably 80 g/L to 130 g/L, from the viewpoint of improving exhaust gas purification performance during warm-up of the engine and high-speed operation.

The wash coat amount of the second catalyst layer 14 in the catalyst layer in the first section V1 is preferably 30 g/L to 65 g/L and more preferably 35 g/L to 60 g/L from the viewpoint of suppressing Pd poisoning and improving exhaust gas purification performance during warm-up of the engine and high-speed operation.

The pore volume proportion of the substrate 111 and the catalyst layers (the first catalyst layer 13 and the second catalyst layer 14) to the volume of the first section V1 is 12% to 18%. In the present invention, the "pore volume proportion" means a value calculated as follows. First, a sample having a cubic shape of 10 mm square is sampled from any place of the first section (that is, the portion V1 shown in FIGS. 1 and 2) of the exhaust gas purification catalyst, and measurement is done for the mass and volume of the sample and the pore size distribution by mercury press-in method. The pore size distribution can be calculated by a known method using the mercury press-in method. The pore volume proportion of the substrate and the catalyst layer to the volume of the first section can be calculated from the following formula:

Pore volume proportion (%)=$W \times P/V \times 100$ when the mass of the measured sample is W (g), the geometric volume of the cube is V (mL), and the volume of mercury press-fitted at an applied pressure of 0.049 to 255 MPa (corresponding to a pore size of 0.06 μm to 30.0 μm: Hg contact angle of 140°) among the results of the pore size distribution measurement is pore volume P (mL/g). In addition, the substrate and the catalyst layer to the volume of the second section to be described below can also be measured in the same manner as the pore volume proportion of the substrate and the catalyst layer to the volume of the first section.

The pore volume proportion of the substrate and the catalyst layer to the volume of the first section is 12% or more and less than 18% of the volume of the first section (i.e., the apparent volume of the entire first section including not only the volume of the partition walls of the substrate and the catalyst layer but also the space between the partition walls in the substrate). Since the catalyst layer of the exhaust gas purification catalyst is composed of a porous material made of fine pores having an oxide supporting material as a skeleton as described above, it can be said that the majority of the volume occupied by the catalyst layer is voids. Therefore, it can be said that the pore volume measured under the above conditions reflects the thickness of the catalyst layer. The thickness of the catalyst layer indicates the volume at which the purification gas and the active ingredient can come into contact per unit area, and if the catalyst layer is not sufficiently thick, the probability of contact between the purification gas and the active ingredient decreases and high purification performance cannot be obtained. On the other hand, if the catalyst layer is made excessively thick, the pressure loss in the catalyst layer increases when the exhaust gas is allowed to flow through the catalyst. That is, since the supporting material for dispersing the catalytic active component was also reduced when the wash coat amount is reduced in order to improve the exhaust gas purification performance during warm-up of the engine as described above, the thickness of the catalyst layer had to be reduced in the conventional method. In view of the above point, the present invention has found that the exhaust gas purification performance during high-speed operation can also be improved by setting the pore volume proportion of the substrate and the catalyst layer to the volume of the first section to 12% or more. Further, when the pore volume proportion is less than 18%, it can be said that no significant pressure loss occurs. That is, when the pore volume proportion is 12% or more and less than 18%, the catalyst layer having a sufficient thickness is formed so that the contact between the exhaust gas and the catalytic active component becomes active, and as a result, high exhaust gas purification performance can be achieved and also no significant pressure loss occurs. In addition, by designing the catalyst layer such that the pore volume proportion is 12% or more and less than 18% even when the wash coat amount is 190 g/L or less, the density of the catalyst layer in the first section becomes moderately low, and even when the first catalyst layer is covered by the second catalyst layer, the reaction heat increases because the exhaust gas easily passes through the second catalyst layer and comes into contact with the first catalyst layer, thereby making it possible to accelerate the temperature rise of the first catalyst layer. Further, high-temperature exhaust gas passes through the catalyst layer of the first section easily, and the temperature rise of the catalyst layer can be accelerated together with the thickness (wash coat amount) of the catalyst layer in the first section. As a result, exhaust gas purification performance during warm-up of the engine and high-speed operation can be improved while suppressing the catalytic activity from decreasing due to phosphorus poisoning of the Pd catalyst layer.

As described above, the value of the pore volume proportion reflects the thickness of the catalyst layer, and tends to become larger as the density of the catalyst layer is lower (the catalyst layer is bulky) and as the wash coat amount of the catalyst layer is larger. In other words, the value of the pore volume proportion can be controlled by adjusting the density of the catalyst layer and the wash coat amount of the catalyst layer. For example, as shown in the evaluation results of Example 1, Example 4, and Comparative Example 1 described later, the value of the pore volume proportion of the first section tends to increase as the amount of wash coat increases when the same slurry is used to form the first catalyst layer 13 and the density of the first section is made the same. On the other hand, as shown in the evaluation result of Comparative Example 5 to be described later, when the particles in the slurry for forming the first catalyst layer 13 have a small particle size and the density of the first section is increased, the value of the pore volume proportion tends to become relatively small even if the wash coat amount was increased. According to the exhaust gas purification catalyst of the present embodiment, it is possible to enhance the exhaust gas purification performance during warm-up of the engine and high-speed operation while suppressing the catalytic activity from decreasing due to phosphorus poisoning of the Pd catalyst layer by controlling each of the pore volume proportion and the wash coat amount for the first section.

On the other hand, when the pore volume proportion of the catalyst layer in the first section is less than 12%, the exhaust gas purification performance can be impaired because the exhaust gas does not easily pass through the catalyst layer in the first section. The pore volume proportion of the catalyst layer in the first section is preferably 13% or more and less than 17%.

As a method for controlling the pore volume proportion of the catalyst in the first section to be within the above range while the wash coat amount of the catalyst layer in the first section is within the above range, for example, a method for controlling each of the particle sizes of the slurry constituent materials for forming the first catalyst layer 13 and the second catalyst layer 14 may be mentioned. With respect to the particle size of the slurry constituent material for forming the first catalyst layer 13, when the volume-converted particle size distribution is observed at regular intervals by a particle size distribution metre employing a light scattering method, the particle size (D50) that is the cumulative sum of 50% in the undersize cumulative distribution for the spherical equivalent diametre is preferably more than 10 μm and 20 μm or less, more preferably 11 μm to 15 μm. The particle size (D90) that is the cumulative sum of 90% is preferably 20 μm to 45 μm, and more preferably 20 μm to 40 μm. As the particle size of the slurry constituent material for forming the second catalyst layer 14, the D50 particle size is preferably more than 10 μm and 25 μm or less, and more preferably 11 μm to 20 μm. The D90 particle size is preferably more than 20 μm and 50 μm or less, and more preferably 21 μm to 45 μm.

It is preferable that the second catalyst layer 14 covering the first catalyst layer 13 has a through hole having a width of 10 μm or more which can vent air from the surface to the first catalyst layer. By having such communicating pores, high-temperature exhaust gas easily passes through the second catalyst layer and comes into contact with the first catalyst layer, so that the exhaust gas purification performance during warm-up of the engine and high-speed operation can be further enhanced.

From the viewpoint of improving exhaust gas purification performance during warm-up of the engine and high-speed operation, it is preferable that the palladium concentration in the first catalyst layer is higher in the surface layer (i.e., closer to the side in contact with the second catalyst layer).

In particular, when the first catalyst layer is divided into two parts along the thickness direction, and the mass of palladium on the surface side of the first catalyst layer is defined as a1 and the mass of palladium on the opposite side to the surface side of the first catalyst layer is defined as a2, the value of a1/a2 (hereinafter also referred to as a concentration gradient) obtained is more preferably, 1.2 or more. By disposing a larger amount of palladium on the surface side than on the substrate side in the first catalyst layer, the catalyst function by the specific element of the catalyst layer can be efficiently performed at a high space speed. As a result, CO oxidation and HC oxidation, which are exothermic reactions, are further promoted compared with the case where the concentration of palladium is made uniform in the layer thickness direction, and thus the temperature raising property of the catalyst can be enhanced. NOx reduction property in the second catalyst layer can also be enhanced by enhancing the temperature raising property of the catalyst. From the viewpoint of enhancing the exhaust gas purification action during warm-up of the engine and high-speed operation, particularly the action during high-speed operation, it is more preferable that the concentration gradient is 1.3 to 3.0.

Specifically, the concentration gradient of palladium in the first catalyst layer can be obtained by the following method. That is, in the palladium fluctuation curve obtained by quantifying the distribution of palladium (unit:cps) by line analysis of energy dispersive X-ray analysis (EDX), the ratio between the integral value of the count number on the surface side than a half position in the thickness direction in the first catalyst layer and the integral value of the count number in the substrate side than the position is obtained, which is then converted into a mass ratio, and is used as the concentration gradient of palladium in the thickness direction.

<Catalyst Layer of Second Section>

The third catalyst layer 15 constituting the catalyst layer in the second section V2 contains palladium (Pd) as a catalytically active component, but may also contain other catalytically active components such as platinum (Pt) and rhodium (Rh). In particular, it is preferable to contain Pd and Pt as catalytically active components from the viewpoint of high purification performance of carbon monoxide (CO) and hydrocarbon (HC) and obtaining a high warming function. In a preferred embodiment, the catalytically active components are the same as those of the first catalyst layer described above.

It is preferable for the third catalyst layer 15 to further contain a carrier component that carries a catalytic active component, in view of efficiently exhibiting the exhaust gas purification performance by the catalytic active component. The same carrier component as that of the first catalyst layer 13 in the first section V1 can be used as the carrier component.

In order to form the third catalyst layer 15 on the substrate 11, a slurry is prepared in the same manner as the first catalyst layer 13 and applied to the substrate surface by a wash coating method, then dried and burned. The wash coat amount of the third catalyst layer 15 is preferably larger than that of the first catalyst layer 13, particularly from the viewpoint of improving the exhaust gas purification performance during high-speed operation.

The fourth catalyst layer 16 covering the third catalyst layer 15 preferably contains rhodium (Rh) as a catalytically active component. Similarly to the catalyst layer of the first section, when phosphorus is contained in the exhaust gas, the catalytic activity of Pd is reduced because when the third catalyst layer 15 containing Pd as a catalytically active component is exposed, the exhaust gas comes into contact with the third catalyst layer 15 first. In order to reduce phosphorus poisoning of Pd, the third catalyst layer 15 is preferably covered with the fourth catalyst layer 16.

In a preferred embodiment, the fourth catalyst layer 16 of the second section V2 has the same catalytic active component as the second catalyst layer described above.

In addition, it is preferable that the fourth catalyst layer 16 further contains a carrier component for carrying the catalytic active component, in view of efficiently exhibiting the exhaust gas purification performance by the catalytic active component. The same carrier component as that of the second catalyst layer 14 in the first section V1 can be used.

The fourth catalyst layer 16 can be formed in the same manner as the second catalyst layer 14 of the first section V1 by applying a slurry to the surface of the third catalyst layer 15 by a wash coating method, followed by drying and firing. The fourth catalyst layer 16 having a desired thickness can be formed by adjusting the amount of the wash coating, but in a preferred embodiment, the amount of the wash coating is the same as that of the second catalyst layer 14.

The catalyst layer in the second section V2 comprising the third catalyst layer 15 and the fourth catalyst layer 16 preferably has a wash coat amount of 180 g/L to 300 g/L per 1 L of substrate in the substrate 112 present in the first section V2. By making the wash coat amount larger than that of the catalyst layer in the first section (i.e., by making the thickness larger), it is possible to particularly improve the exhaust gas purification effect even more during high-speed operation. A more preferable wash coat amount is 190 g/L to 210 g/L.

The mass per unit volume relative to the volume of the substrate present in the second section V2 of the catalyst layer in the second section V2 (hereinafter referred to as "wash coat amount") can be specified in the same manner as in the above-described method for specifying the wash coat amount of the catalyst layer in the first section V1. That is, first, a sample which extends in the exhaust gas flow direction of the substrate 11 (in the X direction in FIG. 2) from the exhaust gas purification catalyst 10 and has the same length as the length L2 of the substrate 112 is cut out. The sample is, for example, a cylindrical shape having a diametre of 25.4 mm. Next, the cut sample is cut in a planar face perpendicular to the exhaust gas flow direction of the substrate 11 to prepare a cut piece S2 of the exhaust gas purification catalyst 10 including the second section V2. The cut piece S1 is, for example, a cylindrical shape having a diametre of 25.4 mm and a length of 10 mm. Although the value of the diametre of the cut piece S2 can be changed as necessary, the exhaust gas purification catalyst 10 may be cut as it is in a planar surface perpendicular to the exhaust gas flow direction so as to have the same diametre as the exhaust gas purification catalyst 10 from the viewpoint of suppressing variations in the wash coat amount depending on the cutting position of the sample. The length value of the cut piece S2 can be changed as necessary. The length of the catalyst layer in the second section V2 included in the cut piece S2 is equal to the length of the cut piece S2.

From the cut piece S2 thus produced, the wash coat amount of the catalyst layer in the second section V2 (and each wash coat amount of the third catalyst layer 15 and the fourth catalyst layer 16) can be specified in the same manner as in the method for specifying the wash coat amount of the catalyst layer in the first section V1. In addition, when calculating the wash coat amount of the catalyst layer in the second section V2, the mass of the catalyst layer in the second section V2 per unit volume of the cut piece S2 may be calculated without using the cut piece of the substrate 11. The calculation method is the same as that for calculating the wash coat amount of the catalyst layer of the first section V1.

From the viewpoint that it is possible to improve the exhaust gas purification performance during warm-up of the engine and high-speed operation more, the wash coat amount of the catalyst layer in the first section V1 is preferably 90% or less, more preferably 80% or less, of the wash coat amount of the catalyst layer in the second section V2.

It is preferable that the pore volume proportion of the substrate and the catalyst layer to the volume of the second section V2 is 18% to 25%. By making the catalyst layer thicker than that of the first section V1, it is possible to enhance the exhaust gas purification effect during high-speed operation. In particular, the exhaust gas purification effect during high-speed operation can be enhanced even more by providing each catalyst layer in such a manner that the pore volume proportion of the substrate and the catalyst layer to the volume of the first section is 90% or less of the pore volume proportion of the substrate and the catalyst layer to the volume of the second section. The pore volume proportion of the substrate and the catalyst layer to the volume of the second section V2 can be measured in the same manner as the pore volume proportion of the substrate and the catalyst layer to the volume of the second section V1.

The length ratio of the first section V1 to the second section V2 in the exhaust gas flow direction X is not particularly limited, but in view that the exhaust gas purification performance during start-up and high-speed operation can be enhanced even more and the ease of manufacture, it is preferable that the length of the exhaust gas flow direction X in the first section V1 be 20% to 70% with respect to the length of the exhaust gas flow direction of the substrate 11.

The exhaust gas purification catalyst according to the present invention can be made into an exhaust gas purification catalyst having excellent exhaust gas purification performance during warm-up of the engine and high-speed operation without lowering the Pd catalytic activity in spite of the limited amount of the catalytic active component compared with the conventional exhaust gas purification catalyst. Therefore, the exhaust gas purification catalyst of the present invention can efficiently purify NOx, HC and CO as an exhaust gas purification catalyst for an internal combustion engine powered by fossil fuel such as a gasoline engine or a diesel engine. Therefore, it is possible to provide an exhaust gas purification system in which exhaust gas from an internal combustion engine is introduced into the exhaust gas purification catalyst without passing through another exhaust gas purification catalyst in an exhaust gas path connected to the internal combustion engine.

EXAMPLES

Next, the embodiments of the present invention shall be specifically described with reference to the following Examples, but the present invention shall not be limited to these Examples.

Example 1

(1) Preparation of Base Slurry for Formation of Lower Catalyst Layer (First Catalyst Layer 13 and Third Catalyst Layer 15)

An OSC material having the following composition and specific surface area was prepared.

$CeO_2$: 30% by mass, $ZrO_2$: 58% by mass, $La_2O_3$: 8% by mass, $Nd_2O_3$: 4% by mass, specific surface area: 50 $m^2/g$.

$CeO_2$, $La_2O_3$, $Nd_2O_3$ and $ZrO_2$ were forming a solid solution in the OSC material.

In a ball mill pot were added the OSC material, lanthanum oxide-modified alumina ($La_2O_3$-modified amount: 3% by mass, specific surface area: 100 $m^2/g$), barium acetate and alumina sol, and water and mixing and pulverization were conducted by a ball mill to obtain a base slurry for a lower catalyst layer. When ball milling was performed, a volume-converted particle size distribution was observed at regular intervals by a particle size distribution metre using a light scattering method. The mixing and pulverization by the ball mill were carried out until the particle size that is 50% in cumulative sum was 12 μm or less and the particle size of 90% fell within the range of 20 μm to 35 μm in the cumulative undersize distribution of the spherical equivalent diametre of the slurry constituent material. The amount ratio of each component in the slurry was set to 50% by mass of the OSC material, 30% by mass of lanthanum oxide-modified alumina, 10% by mass of barium carbonate, and 10% by mass of alumina.

(2) Formation of the First Catalyst Layer 13 Before Surface Concentration Treatment The base slurry was dipped from the upstream end in the exhaust gas flow direction X of the cordierite honeycomb porous substrate 11 (manufactured by NGK Insulators, Ltd., axial length 100 mm, outer diametre 93 mm, number of cells 600 cells/$inch^2$) to the intermediate position in the same direction of the substrate 11, and then coated. Thereafter, the substrate 11 was dried at 150° C. for 2.5 hours and then burned at 450° C. for 2.5 hours to form the first catalyst layer 13 of the first section V1. The mass per unit volume (wash coat amount) with respect to the volume of the substrate 111 present in the first section V1 of the first catalyst layer 13 was 95 g/L.

(3) Formation of the Third Catalyst Layer 15

The base slurry and an aqueous palladium nitrate solution were mixed to obtain a slurry for the third catalyst layer 15. The amount of palladium nitrate in the slurry for the third catalyst layer 15 was set to an amount in which Pd consisted for 0.667% by mass in the third catalyst layer 15 after burning. A portion from the downstream end in the exhaust gas flow direction X of the substrate 11 to the intermediate position in the same direction of the substrate 11 was dipped in the slurry for the third catalyst layer 15 and coated. Thereafter, the substrate 11 was dried at 150° C. for 2.5 hours and then burned at 450° C. for 2.5 hours to form the third catalyst layer 15 of the second section V2. The mass per unit volume (wash coat amount) relative to the volume of the substrate 112 present in the second section V2 of the third catalyst layer 15 was 150 g/L. The content of Pd in the third catalyst layer 15 was 1.00 g/L relative to the volume of the third catalyst layer 15.

The first catalyst layer 13 and the third catalyst layer 15 were connecting without a gap on the substrate 11 in the exhaust gas flow direction X. The length ratio of the first catalyst layer 13 to the third catalyst layer 15 in the exhaust gas flow direction X was 1:1, and the length in the exhaust gas flow direction X of the lower catalyst layer comprising the first catalyst layer 13 and the third catalyst layer 15 was the same as the length in the exhaust gas flow direction X of the substrate 11.

(4) Pd Surface Concentration Support

Palladium nitrate aqueous solution (Pd equivalent concentration: 5.00 g/L, liquid amount: 340 ml) was immersed for only the portion of the substrate 11 where the first catalyst layer 13 was formed (i.e., the portion of substrate 111) at 25° C. for 48 hours. After immersion, gradual dehydration was performed, and the substrate 11 was dried at 150° C. for 2.5 hours and burned at 450° C. for 2.5 hours. The amount of Pd in the first catalyst layer 13 was 5.00 g/L with respect to the volume of the first catalyst layer 13.

(5) Formation of an Upper Catalyst Layer (Second Catalyst Layer 14 and Fourth Catalyst Layer 16)

OSC materials having the following composition and specific surface area were prepared.

$CeO_2$: 15% by mass, $ZrO_2$: 73% by mass, $La_2O_3$: 8% by mass, $Nd_2O_3$: 4% by mass, BET specific surface area: 50 $m^2/g$ In the OSC material, $CeO_2$, $ZrO_2$, $La_2O_3$, and $Nd_2O_3$ formed a solid solution.

To a ball mill pot were added a $ZrO_2$-based material, lanthanum-modified alumina (modified amount of $La_2O_3$: 3% by mass, BET specific surface area: 100 $m^2/g$), alumina sol and water, and the mixture was mixed and pulverized by a ball mill to obtain a base slurry for an upper catalyst layer. When the ball milling was performed, a volume-converted particle size distribution was observed at regular intervals by a particle size distribution metre using a light scattering method. The ball milling was performed until the particle size that is the cumulative sum of 50% was 15 μm or less and the particle size that is 90% fell within the range of 25 μm to 40 μm in the undersize cumulative distribution for the spherical equivalent diametre of the slurry constituting material. This slurry and an aqueous solution of rhodium nitrate were mixed to obtain a slurry for an upper catalyst layer. The amount ratio of each component in the slurry for an upper catalyst layer was such that, after burning, the ratio of components other than rhodium in the upper catalyst layer was 60% by mass of a $ZrO_2$-based material, 30% by mass of lanthanum modified alumina, and 10% by mass of alumina, and the amount of rhodium in the upper catalyst layer was 0.5% by mass.

A substrate 11 having a lower catalyst layer (a first catalyst layer 13 and a third catalyst layer 15) formed thereon is immersed in the obtained slurry for an upper catalyst layer, then the substrate 11 is dried at 150° C. for 2.5 hours, and then burned at 450° C. for 2.5 hours to form an upper catalyst layer over the entire surface of the lower catalyst layer, thereby obtaining an exhaust gas purification catalyst of Example 1.

The mass per unit volume (wash coat amount) of the substrate 11 (111 and 112) present in the first section V1 and the second section V2 of the upper catalyst layer was 45 g/L. The rhodium content in the upper catalyst layer was 0.225 g/L with respect to the volume of the substrate 11.

(6) Measurement of Pore Volume Proportion

A cube-shaped catalyst piece sample having an angle of about 10 mm was each cut out from the central portion in the axial direction (exhaust gas flow direction) of the first section (first catalyst layer 13 and second catalyst layer 14) and the second section (third catalyst layer 15 and fourth catalyst layer 16) and from a portion excluding 5 mm from the side surface outer circumference. With respect to the cut out catalyst piece, each side was measured to calculate the volume V (mL) of the cube-shaped catalyst piece. In addition, the weight W (g) of the catalyst piece was measured in a sufficiently dry state, keeping in mind the absorption of moisture and the like. The pore distribution of the catalyst piece was measured by a mercury press-in method (atmospheric pressure to 255 MPa).

Among the pore distribution measurement results, the volume of mercury press-fitted at an applied pressure of 0.049 to 255 Mpa (corresponding to a pore diametre of 0.06 μm to 30.0 μm: Hg contact angle of 140°) was regarded as pore volume P (mL/g), and the pore volume proportion was calculated by the following formula.

Pore volume proportion (%)=$W \times P/V \times 100$ (7) Measurement of Pd Concentration Gradient The exhaust gas purification catalyst was measured for the concentration gradient a1/a2. Specifically, the concentration change of Pd was measured from the surface of the upper catalyst layer toward the substrate 11 using EDX (model number: XM-8101, manufactured by Nihon Denshi Co., Ltd.) in such a manner that the observation face will be the central portion in the axial direction (exhaust gas flow direction) of the first section (the first catalyst layer 13 and the second catalyst layer 14) and the portion other than 5 mm from the side surface outer circumference (outer skin). From the measurement results, the ratio (a1/a2) of the concentration at of Pd on the surface side to the concentration a2 of Pd on the opposite side (the substrate 11 side) was obtained when the first catalyst layer 13 was equally divided into two parts of the surface side and the substrate 11 side along the thickness direction.

Example 2

A catalyst for purifying exhaust gas of Example 2 was prepared in the same manner as in Example 1, except that in (3) the formation of the third catalyst layer 15, the Pd content in the third catalyst layer 15 was changed to 2.00 g/L, and the Pd concentration in the palladium nitrate aqueous solution was adjusted in the Pd surface concentration support of (4) to change the Pd amount in the first catalyst layer 13 to 4.00 g/L.

Example 3

An exhaust gas purification catalyst of Example 3 was prepared in the same manner as in Example 1, except that the length of the first section V1 was changed to 25 mm, the length of the second section V2 was changed to 75 mm, and the Pd concentration in the palladium nitrate aqueous solution was adjusted in the Pd surface concentration support of (4) to change the amount of Pd in the first section V1 to 9.00 g/L.

Example 4

An exhaust gas purification catalyst of Example 4 was prepared in the same manner as in Example 1 except that the wash coat amount of the upper catalyst layer was changed to 60 g/L. An upper catalyst layer was formed by adjusting the mixing ratio of the base slurry and rhodium nitrate so that the Rh content of the upper catalyst layer was 0.225 g/L.

Comparative Example 1

An exhaust gas purification catalyst of Comparative Example 1 was prepared in the same manner as in Example 1 except that the wash coat amount of the upper catalyst layer was changed to 70 g/L. An upper catalyst layer was formed by adjusting the mixing ratio of the base slurry and rhodium nitrate so that the Rh content of the upper catalyst layer was 0.225 g/L.

Comparative Examples 2 to 4

Exhaust gas purification catalysts of Comparative Examples 2 to 4 were prepared in the same manner as in Example 1 except that the coating amounts of the first section, the second section, and the upper catalyst layer were respectively changed as shown in Table 1.

Comparative Example 5

(1) In the preparation of the base slurry for forming the lower catalyst layer, ball milling was carried out for a longer time than that in Example 1, until the particle size (D50) that is the cumulative sum of 50% was 10 μm or less and the particle size (D90) that is the cumulative sum of 90% fell within the range of less than 20 μm in the undersize cumulated distribution for the spherical equivalent diametre of the slurry constituting material.

Also, in the (5) formation of the upper catalyst layer, ball milling was carried out for a longer time than in Example 1, until the D50 particle size was 10 μm or less and the D90 particle size fell within the range of less than 20 μm in the undersieve cumulated distribution for the spherical equivalent diametre of the slurry constituting material.

Then, an exhaust gas purification catalyst of Comparative Example 5 was prepared in the same manner as in Example 1, except that the wash coat amounts of the first catalyst layer 13 and the upper catalyst layers (the second catalyst layer 14 and the fourth catalyst layer 16) of the first section V1 were each changed as shown in Table 1.

TABLE 1

| | Constitution of Catalyst Layer | | | | | | | | | |
|---|---|---|---|---|---|---|---|---|---|---|
| | Length of first section (mm) | Length of second section (mm) | Pd concentration (g/L) | | Wash coat amount of first section (g/L) | | | Wash coat amount of second section (g/L) | | |
| | | | First Section | Second section | First catalyst layer | Second catalyst layer | Total | Third catalyst layer | Fourth catalyst layer | Total |
| Ex. 1 | 50 | 50 | 5 | 1 | 100 | 45 | 145 | 150 | 45 | 195 |
| Ex. 2 | 50 | 50 | 4 | 2 | 99 | 45 | 144 | 151 | 45 | 196 |
| Ex. 3 | 25 | 75 | 9 | 1 | 104 | 45 | 149 | 150 | 45 | 195 |
| Ex. 4 | 50 | 50 | 5 | 1 | 100 | 60 | 160 | 150 | 60 | 205 |
| Comp. Ex. 1 | 50 | 50 | 5 | 1 | 100 | 70 | 170 | 150 | 70 | 220 |
| Comp. Ex. 2 | 50 | 50 | 5 | 1 | 150 | 45 | 195 | 150 | 45 | 195 |
| Comp. Ex. 3 | 50 | 50 | 5 | 1 | 150 | 45 | 195 | 135 | 45 | 180 |
| Comp. Ex. 4 | 50 | 50 | 5 | 1 | 150 | 45 | 195 | 100 | 45 | 145 |
| Comp. Ex. 5 | 50 | 50 | 5 | 1 | 150 | 70 | 220 | 150 | 70 | 220 |

| | Constitution of Catalyst Layer | | | |
|---|---|---|---|---|
| | Wash coat amount of first section/ Wash coat amount of second section (%) | Pore volume proportion (%) | | Pd concentration gradient of First section lower layer (a1/a2) |
| | | First section | Second section | First section/ Second section (%) | |
| Ex. 1 | 74.4 | 16.04 | 18.13 | 88 | 1.52 |
| Ex. 2 | 73.5 | 15.21 | 18.46 | 82 | 1.47 |
| Ex. 3 | 76.4 | 15.18 | 18.33 | 83 | 1.30 |
| Ex. 4 | 72.7 | 17.09 | 19.18 | 89 | 1.56 |
| Comp. Ex. 1 | 73.9 | 18.25 | 19.86 | 92 | 1.45 |
| Comp. Ex. 2 | 100 | 18.03 | 18.13 | 98 | 1.83 |
| Comp. Ex. 3 | 108 | 18.33 | 17.34 | 108 | 1.72 |
| Comp. Ex. 4 | 135 | 12.05 | 16.13 | 128 | 1.77 |
| Comp. Ex. 5 | 100 | 14.51 | 12.92 | 87 | 1.88 |

<Evaluation of Exhaust Gas Purification Performance>

The following endurance conditions were imposed for the exhaust gas purification catalyst as a deterioration treatment assuming mileage of 5 to 100,000 kilometres. Specifically, treatment was done for the following time while keeping the catalyst temperature at the following temperature in a state where the exhaust gas discharged by operating the engine under the following conditions was brought into contact with the exhaust gas purification catalyst.

(Endurance Condition)
    Endurance Engine: Passenger NA2L gasoline engine
    Gasoline used: Commercially available regular gasoline
    Endurance temperature·time: 900° C.-100 hr
    Pre-catalyst air-fuel ratio fluctuation: A/F=repeat of 13.5 (10 sec)→15.5 (20 sec)→13.5 (10 sec)

After the durability test was carried out under the above conditions, the exhaust gas purification catalyst after endurance was installed in the following vehicle. As a vehicle test, the vehicle was operated under the operating conditions of the New European Driving Cycle (NEDC). The emissions of non-methane hydrocarbons (NMHC) and nitrogen oxides (NOx) in the exhaust gases (emission values: g/test) were each measured in the Urban Driving Mode (ECE) from the start of operation to 780 seconds and in the High Speed Driving Mode (EUDC) from 780 seconds to 1180 seconds from the start of operation. Table 2 shows the emission values obtained in the Urban Driving Mode (ECE) and in the High Speed Driving Mode (EUDC) which the values were obtained by regarding the value of Example 1 as being the standard as 1. Also shown in Table 2 are the NEDC emissions (total emissions), which are the total emissions in ECE and EUDC for each of NMHC and NOx.

(Purification Rate Measurement Conditions)
    Evaluation Vehicle: Small Passenger Vehicle
    Gasoline Used: Certification Test Fuel

TABLE 2

| | Evaluation | | | | | |
|---|---|---|---|---|---|---|
| | ECE Condition | | EUDC Condition | | Total | |
| | NMHC emission amount | NOx emission amount | NMHC emission amount | NOx emission amount | NMHC emission amount | NOx emission amount |
| Ex. 1 | 1.000 | 1.000 | 1.000 | 1.000 | 1.000 | 1.000 |
| Ex. 2 | 1.076 | 1.306 | 0.994 | 0.803 | 1.070 | 0.932 |
| Ex. 3 | 1.015 | 1.104 | 1.043 | 1.094 | 1.018 | 1.100 |
| Ex. 4 | 1.082 | 1.040 | 0.978 | 0.888 | 1.056 | 0.937 |
| Comp. Ex. 1 | 1.085 | 1.044 | 1.026 | 0.918 | 1.081 | 0.950 |
| Comp. Ex. 2 | 1.140 | 0.865 | 1.019 | 0.802 | 1.133 | 0.824 |
| Comp. Ex. 3 | 1.196 | 0.962 | 1.049 | 0.987 | 1.188 | 0.978 |
| Comp. Ex. 4 | 1.197 | 0.968 | 1.163 | 1.016 | 1.195 | 1.004 |
| Comp. Ex. 5 | 1.184 | 1.077 | 1.126 | 1.110 | 1.142 | 1.136 |

As is clear from the evaluation results shown in Table 2, the exhaust gas purification catalysts of Examples 1 to 3 have lower total NMHC emissions than the exhaust gas purification catalysts of Comparative Examples 1 to 5, and therefore it has been confirmed that the exhaust gas purification catalyst employing the features of the present invention exhibits high exhaust gas purification performance without impairing the Pd catalytic activity.

EXPLANATION OF REFERENCES

10 Exhaust gas purification catalyst
11 Substrate
111 Substrate present in the first section
112 Substrate present in the second section
12 Catalyst layer
13 First catalyst layer
14 Second catalyst layer
15 Third catalyst layer
16 Fourth catalyst layer
20 Casing
V1 First section
V2 Second section

The invention claimed is:

1. An exhaust gas purification catalyst comprising a substrate and a catalyst layer provided on the substrate, said catalyst having a first section located upstream along a flow direction of the exhaust gas and a second section located downstream from the first section, wherein
the catalyst layer in the first section comprises a first catalyst layer comprising palladium and a second catalyst layer comprising rhodium and covering the first catalyst layer;
a pore volume proportion is 12% or more and less than 18% wherein the pore volume proportion is a proportion of a total volume of the pores, which have a pore diameter of 0.06 μm to 30.0 μm as measured by mercury press-in method and existing in the substrate and the catalyst layer in the first section to a volume of the entire first section; and
a wash coat amount is 100 g/L to 190 g/L, wherein a wash coat amount is a mass per unit volume of the catalyst layer in the first section to the volume of the substrate existing in the first section.

2. The exhaust gas purification catalyst according to claim 1, wherein said catalyst has a value of a1/a2 is 1.2 or more, wherein
when the first catalyst layer is divided into two equal portions along a thickness direction, a1 is defined as a mass of palladium existing on a surface side of the first catalyst layer, and a2 is defined as a mass of palladium existing on an opposite side to the surface side of the first catalyst layer when the first catalyst layer is divided into two equal portions along the thickness direction.

3. The exhaust gas purification catalyst according to claim 1, wherein
a pore volume proportion is 8% to 25%, wherein the pore volume proportion is a proportion of a total volume of the pores, which have a pore diameter of 0.06 μm to 30.0 μm as measured by the mercury press-in method, existing in the substrate and the catalyst layer in the second section to a volume of the entire second section.

4. The exhaust gas purification catalyst according to claim 1, wherein
the catalyst layer in the second section comprises a third catalyst layer comprising palladium and a fourth catalyst layer comprising rhodium and covering the third catalyst layer.

5. The exhaust gas purification catalyst according to claim 1, wherein
the pore volume proportion of the substrate and the catalyst layer in the first section is not more than 90% of the pore volume proportion of the substrate and the catalyst layer in the second section.

6. The exhaust gas purification catalyst according to claim 1, wherein
the wash coat amount which is the mass per unit volume of the catalyst layer in the second section relative to the volume of the substrate existing in the second section is 180 g/L to 300 g/L.

7. The exhaust gas purification catalyst according to claim 1, wherein
the second catalyst layer has a through-hole having a width of 10 μm or more through which gas passes from a surface thereof to the first catalyst layer.

8. The exhaust gas purification catalyst according to claim 1, wherein
a length of the flow direction of exhaust gas in the first section is 20% to 70% with respect to a length of the flow direction of exhaust gas in the substrate.

9. An exhaust gas purification system in which, in an exhaust path connected to an internal combustion engine, exhaust gas from the internal combustion engine is introduced into the exhaust gas purification catalyst according to claim 1 without passing through any other exhaust gas purification catalyst.

\* \* \* \* \*